United States Patent [19]

Loudon

[11] Patent Number: 4,903,418
[45] Date of Patent: Feb. 27, 1990

[54] HYDRAULIC LOADER ATTACHMENT

[76] Inventor: Robert W. Loudon, 26011 N. Fairfield Rd., Lake Zurich, Ill. 60047

[21] Appl. No.: 281,500

[22] Filed: Dec. 8, 1988

[51] Int. Cl.$^4$ .................... A01G 23/06; E02F 3/76
[52] U.S. Cl. .................... 37/2 R; 37/118 R; 414/685; 414/722
[58] Field of Search ........... 37/2 R, 11 BR, 11 BA; 294/49; 414/685, 722

[56] References Cited

U.S. PATENT DOCUMENTS

| | | | |
|---|---|---|---|
| 293,261 | 2/1884 | Matcham | 37/118 R |
| 1,160,748 | 11/1915 | Natale | 294/55 |
| 1,545,943 | 7/1925 | Crane | 414/722 X |
| 1,828,095 | 10/1931 | Baker | 37/118 A |
| 2,468,220 | 4/1949 | McLendon | 414/685 |
| 2,591,278 | 4/1952 | Morgan | 37/118 R |
| 3,044,192 | 7/1962 | Moore | 37/2 R |
| 3,076,275 | 11/1960 | Boothe | 37/118 R |
| 3,375,596 | 4/1968 | Bacquie | 37/118 R |
| 3,636,612 | 12/1971 | Liebrecht | 37/118 A |
| 3,750,816 | 8/1973 | Becker | 214/767 |
| 3,789,524 | 2/1974 | Mashuda | 37/118 R |
| 3,914,884 | 10/1975 | Guinot | 37/118 R |
| 3,938,680 | 2/1976 | Grimes | 214/145 R |

FOREIGN PATENT DOCUMENTS 1045290  10/1966  United Kingdom ............... 37/2 R Primary Examiner—Randolph A. Reese
Assistant Examiner—Arlen L. Olsen
Attorney, Agent, or Firm—Lockwood, Alex, FitzGibbon & Cummings

[57] ABSTRACT

An apparatus for removing trees, bushes, and other plants for transplantation and other purposes consisting of an elongated, concave scoop mounted on a rigid frame. This apparatus may be adapted for attachment to any standard hydraulically-operated loader. Providing support to the scoop and increasing the rearward carrying capacity of the scoop are gussets which are affixed at the point at which the scoop attaches to the frame.

20 Claims, 3 Drawing Sheets

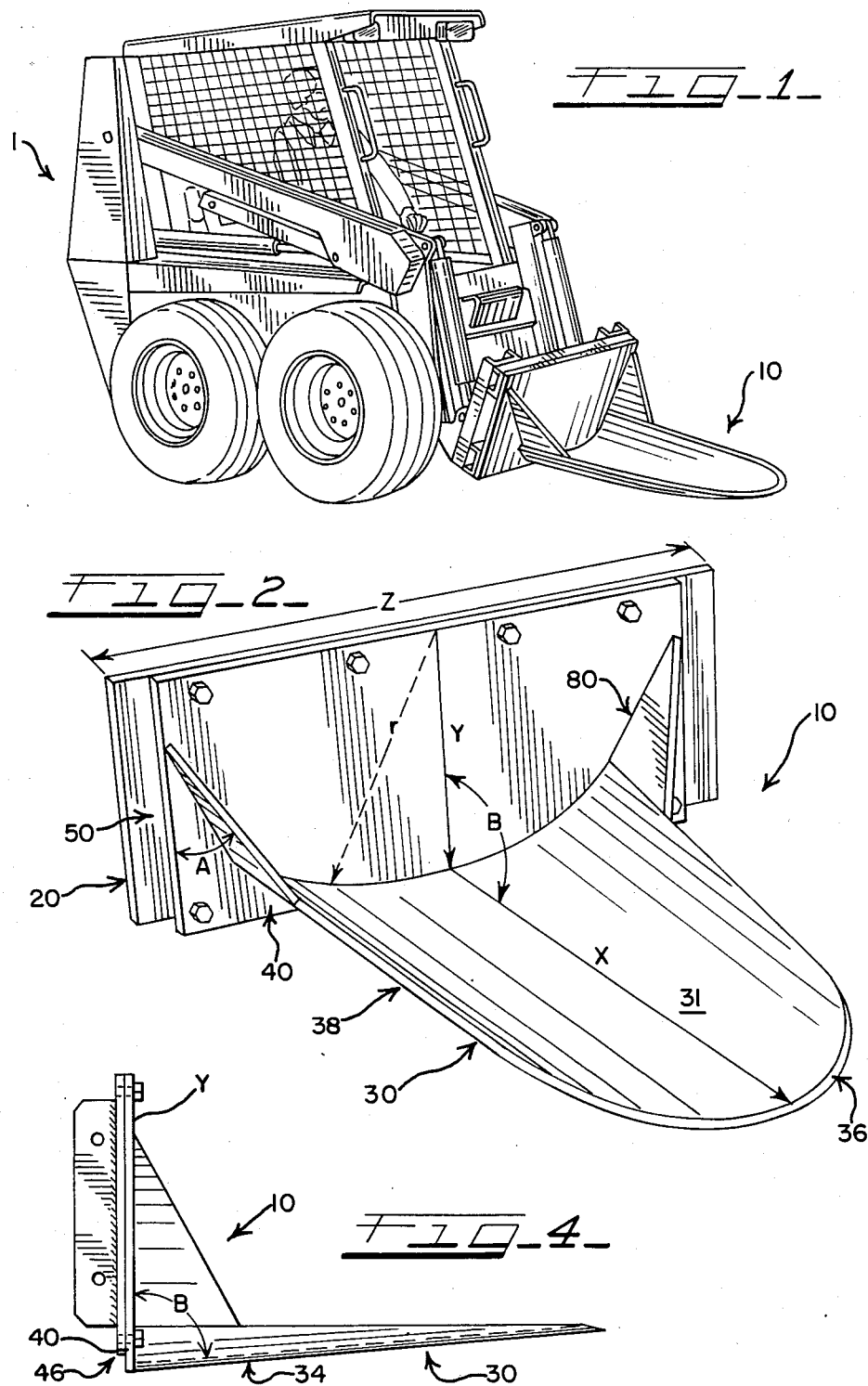

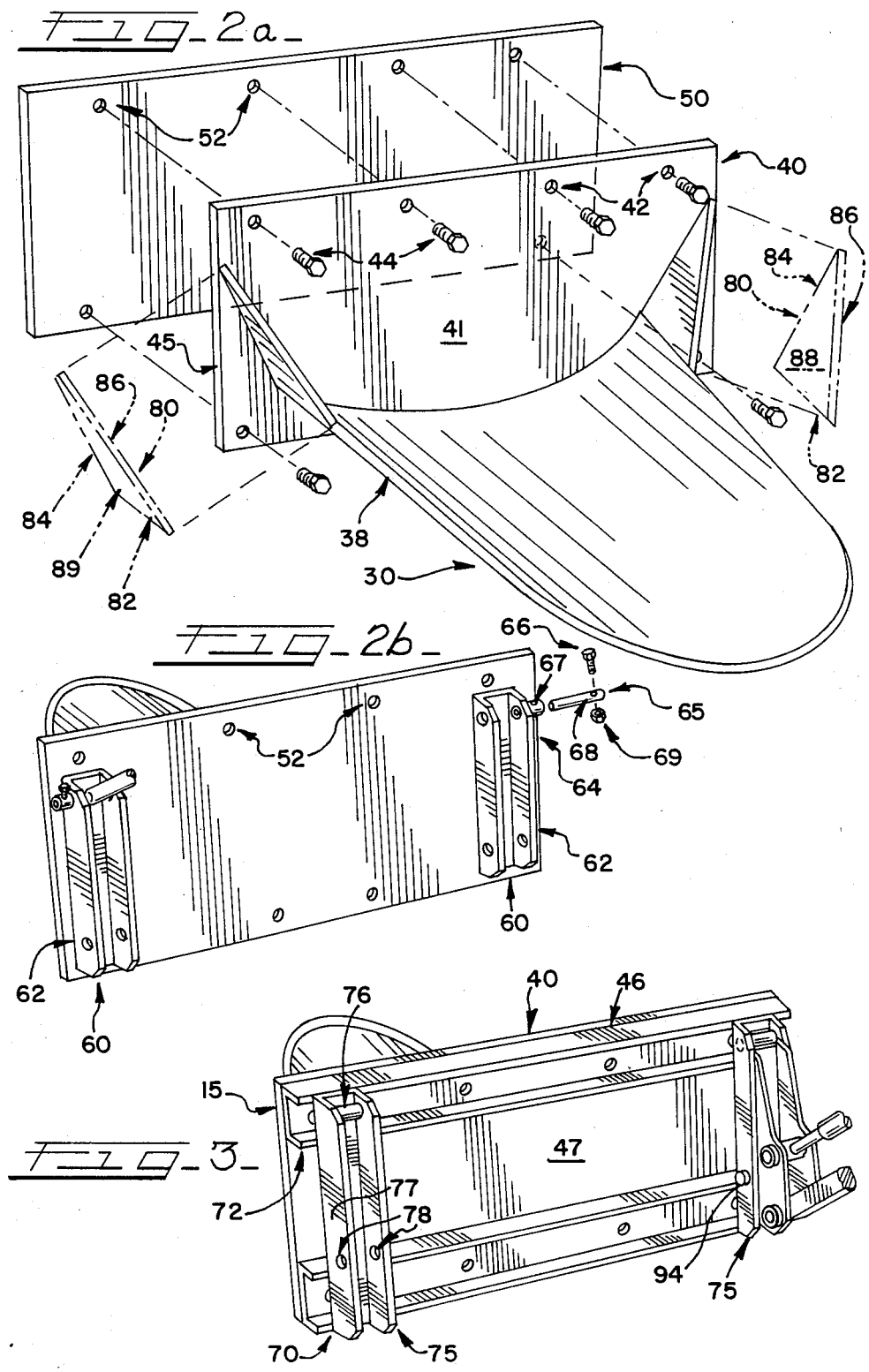

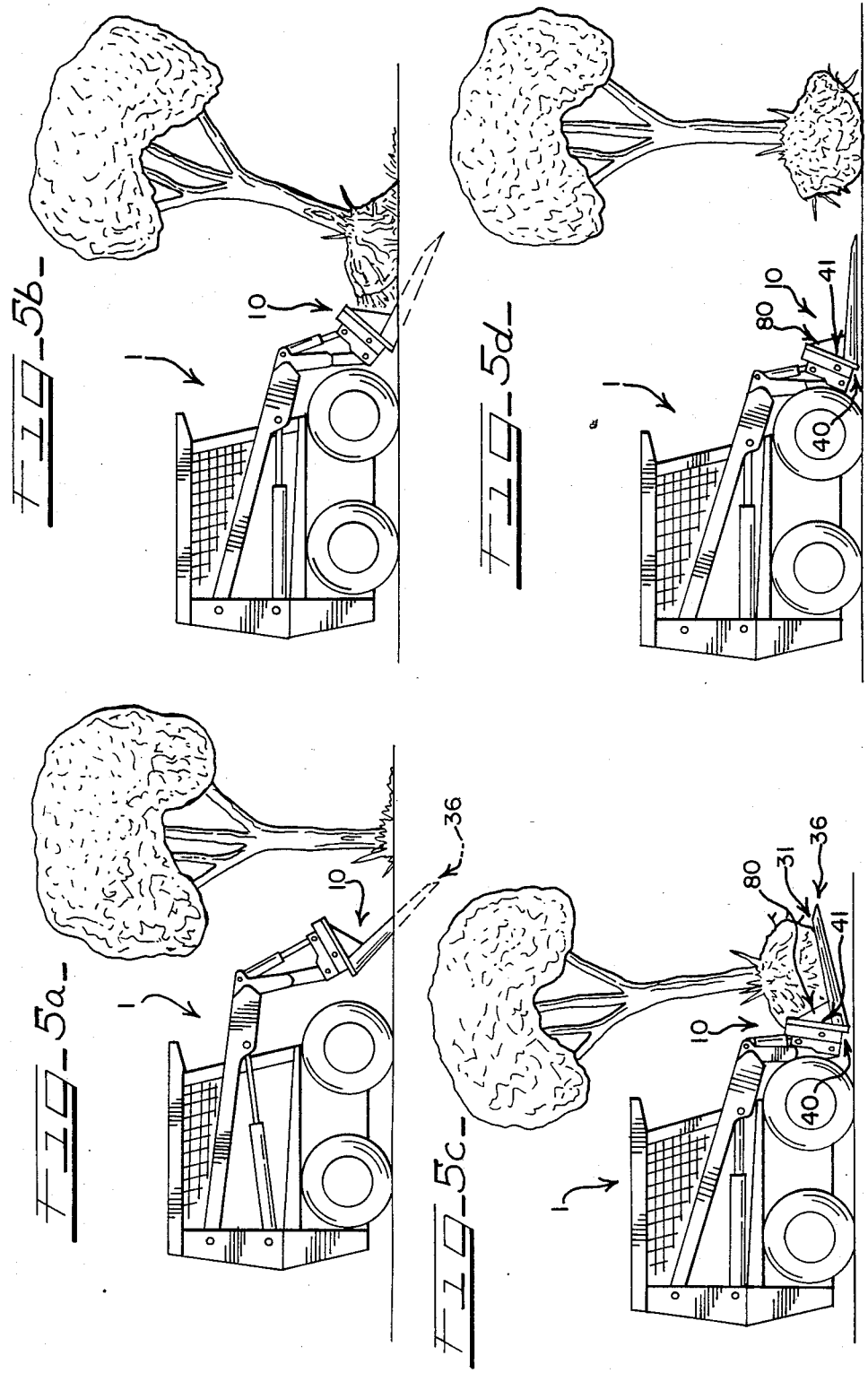

HYDRAULIC LOADER ATTACHMENT

BACKGROUND AND DESCRIPTION OF INVENTION

The present invention relates to a digger apparatus which may be removably attached to a conventional hydraulic loader. More particularly, the invention relates to an elongated scoop member with which, when attached to and operated in conjunction with a hydraulic loader, trees, bushes, and other plants can be dug up quickly. Uniquely, the invention allows plants to be removed with little or no disruption to the soil immediately below and surrounding the base of the plant. By avoiding this disruption, the plant's roots go unharmed, thereby heightening the plant's chances of survival.

The removal of trees, bushes, and similarly sized plants for transplantation purposes has generally presented a problem to plant nurseries, landscapers, and gardeners. Conventionally, a variety of apparatus have been used in removal methods which are labor-intensive, and therefore not cost effective, and which do not guarantee that the plant will be extricated in a damage-free state. One such conventional removal method utilizes a hand shovel. Hand shoveling, however, is labor intensive. Furthermore, a hand shovel is much smaller in proportion to a medium- to large-size plant and the amount of soil surrounding the base of the plant that must be removed with it. Such a smaller size requires repeated entry of the shovel in and around the plant's base in order to loosen the plant from the soil. This increases the likelihood that the plant's most sensitive roots, which grow immediately beneath and around the base of the plant, will be damaged. Even if the plant is loosened from the soil with little damage, the fact that a hand shovel provides little leverage for lifting the plant will likely result in further disruption of the soil around the roots and therefore damage to the plant. Both high labor costs and high loss rates increase a nursery's or a landscaper's cost of doing business.

A hydraulic loader with a standard rectanguloid-like bucket may conventionally be used to remove plants. While the use of this device, decreases the time needed to extricate medium- and large-size plants from the soil, this savings in time is eventually lost due to the shape of the conventional hydraulic loader bucket and the corresponding shape of the block of soil which is removed through the bucket's use. The rectanguloid-shaped bucket of conventional hydraulic loaders is designed to remove and transport quantities of dirt, rock etc.—not to remove plants for transplantation purposes. As a result, plants removed with the conventional bucket have their roots encased in a block of soil which, like the bucket, is rectanguloid in shape. However, as the sensitive roots of any plant reside generally only within a small radius of the base of the plant, the bulk of the soil which the conventional bucket removes is unnecessary and must be trimmed off to produce a commercially saleable and easily transportable product. Trimming requires labor which increases costs. Additionally, because conventional buckets remove more soil than is necessary, conventional buckets require greater inter-plant spacing in which to operate. This prevents a nursery or landscaper from growing plants under economically ideal, dense conditions. Finally, conventional buckets in no way accommodate and provide upright stable support for a plant during the digging, lifting, and transportation of it. The lack of this support leads to increased damage to the plant and heightens the loss rate.

Conventionally, various attachments to a hydraulic loader or a hydraulic loader's conventional bucket have been used to remove plants from the soil. However, these attachments generally have a scoop which is too short to dig to the depth required to remove a plant without damage to its sensitive roots or do not provide stable support for the plant after it has been removed and while it is being transported.

The present invention solves the removal problem. With its use, damage to the plant and costs are minimized. The present invention provides a digger which includes an elongated concave scoop-like structure and which may be easily adapted for attachment to any conventional hydraulic loader. The scoop's elongated shape allows the digger to cut the soil around the base of the plant to a sufficient depth. The scoop's width allows the digger to cut sufficient amount of soil around the plant's base so that repeated reentry is not needed. The scoop's concave shape insures that, when the scoop is operated directly beneath the base of the plant, the plant's roots will be removed with the desired root ball-like structure in place.

Besides removing plants, the concave shape of the scoop allows an operator to dig concave-shaped holes which efficiently accommodate a plant and its root ball with little additional digging required.

Finally, placing the longitudinal axis of the scoop of the digger at an angle to its frame facilitates the break-up and movement of hard-packed, surface soil by the digger.

In addition to the scoop, the invention includes a frame. The frame may include a backing plate to which the scoop is attached. Attachment of the backing plate to the hydraulic loader may be accomplished through a number of means. This may include an attachment plate. It is the hydraulic loader and specifically its conventional hydraulic cylinder/piston arrangement which provide the means by which the digger through attachment to the hydraulic loader by the frame is able to move.

An object of the present invention is to provide an unique scoop-like digger which may be easily adapted for attachment to any hydraulic loader, thereby increasing the loader's versatility.

An additional object of the present invention is to provide a digger with an elongated concave shape which may be easily adapted for attachment to any hydraulic loader and through which plants may be dug up efficiently and without damage.

Another object of the present invention is to provide a scoop-like digger in which the base of the scoop is in closer proximity to the ground at the attachment point of the scoop to its frame and higher from the ground at the lip of the scoop so that the weight of a plant or plants transported on the digger naturally shifts to a stable position to the rear and against the frame of the digger.

A further object of this invention is to provide a scoop-like digger which may be used to move soil which is above or near the surface and may be hard-packed.

These together with other objects and advantages will become subsequently apparent and reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a front perspective view of the digger according to the present invention and as mounted on a conventional hydraulic loader.

FIG. 2 is a front perspective view of a preferred embodiment of the digger.

FIG. 2a is a perspective exploded view from the forward loadable side of a representative embodiment of the digger whose frame includes a baking plate and an attachment plate.

FIG. 2b is a rearward perspective view of the attachment plate illustrated also in FIG. 2 further illustrating the attachment means.

FIG. 3 is a rearward perspective view of an alternative embodiment of the digger whose frame includes a backing plate to which a means, different from that illustrated in FIGS. 2, 2a, 2b, and 2c is used to attach the digger to the hydraulic loader.

FIG. 4 is a sectional view of the preferred embodiment of the digger taken generally along the line 4—4 of FIG. 2.

FIGS. 5a-d are side elevational views of an embodiment of the scoop-like digger as mounted on a conventional hydraulic loader and which demonstrates the use of the digger to remove a tree.

DESCRIPTION OF THE PARTICULAR EMBODIMENTS

A known hydraulic loader, illustrated in FIG. 1 and FIGS. 5a-d and generally designated by reference numeral 1, typically has a hydraulically-operated loader mechanism either on the front or on the back of the hydraulic loader. Certain farm tractors or earth movers are hydraulic loaders of this type. The traditional loader mechanism has a head or bucket formed by vertical side walls and whose open area is square or rectangular in cross-section, not shown. The conventional head or bucket is tiltably and pivotally mounted between a pair of hydraulically-activated lifting and supporting arms. The head or bucket can be moved, the extent of which movement is determined by the extendability of the loader mechanism. It is conventional and of well-known construction that a standard hydraulic loader generally moves the bucket contained conventionally thereon by a hydraulic cylinder/piston arrangement. In FIGS. 1 and 5 a-d, a Case, Uni-Loader model, which is largely typical of conventional hydraulic loaders, is illustrated. The loader mechanism includes a hydraulic cylinder and piston assembly. The piston generally is driven by a pump through conduits. The pump is driven by a piston powered by the loader, the latter of which is not shown. Lift arms and tilt linkage, not shown, on the loader cooperate to allow the loader to lift and transport. By movement of the hydraulic cylinder and piston assembly, and associated lift arms and tilt linkage, the loader's bucket moves. Depending on the loader mechanism, conventional loaders may be used to scrape, dig, and/or load material. The loader mechanism is controlled by an operator in the driver's seat.

A digger apparatus or attachment 10 according to the present invention is generally illustrated by reference numeral 10 in FIGS. 1 through 5a-d. Digger apparatus 10 includes a scoop 30 and a frame 20. These will now be discussed.

The frame 20 provides the support for and the means by which the scoop 30 is affixed to the hydraulic loader 1. Depending on the configuration of the hydraulic loader to which the digger apparatus 10 is to be attached, frame 20 may include a backing plate 40 and the means by which the digger apparatus 10 is attached to the hydraulic loader, including an attachment plate 50.

Backing plate 40 is a generally vertical plate which supports scoop 30. Backing plate 40 has a front face 41 which is relatively flat and is proportioned with dimensions that allow the backing plate 40 to support rigidly the scoop 30. These provide stable support for plants lifted and transported with the use of the digger apparatus 10. The backing plate 40 is made from a substance which is suitable for supporting the scoop 30 and the weight it may carry. High tensile steel is appropriate in a thickness of, for example, one-half inch.

The backing plate 40, to which is attached scoop 30, is rigidly joined to the hydraulic loader 1 in a manner which would allow the backing plate 40 and scoop 30 to respond correspondingly to movement of the hydraulic loader 1. One of the many ways by which this joining can h=accomplished is, for example, through the preferred use of an attachment plate 50.

In the embodiment of the digger apparatus 10 which employs an attachment plate 50 and which is illustrated in FIGS. 2, 2a, and 2b, the backing plate 40 has front openings 42 which accept bolts 44, such as one-half inch, grade 5 bolts. Attachment plate 50 is a generally vertical plate and contains rear openings 52 which are of the appropriate dimensions to receive bolts 44 which extend through the backing plate 40 to and into the corresponding rear openings 52 of attachment plate 50. To secure the backing plate 40 to the attachment plate 50, the bolts 44 are received through the front openings 42 in the backing plate 40 and to and into rear openings 52 in the attachment plate 50. Bolts 44 are removable from both the backing plate 40 and the attachment plate 50.

The preferred embodiment of the digger apparatus 10 utilizes an attachment plate 50 with bolts 44 that are removable in order to allow the easy removal of the backing plate 40, to which the scoop 30 is attached, from the hydraulic loader 1. Other diggers or attachments, such as the conventional bucket or head, may then, for example, be attached or reattached, thereby increasing the versatility of the conventional hydraulic loader 1.

As further illustrated in FIGS. 2, 2a, and 2b, the attachment plate 50 may include vertical supports 60 which may be affixed to and situated rearwardly of the attachment plate 50. Vertical supports 60 may be generally U-shaped structures with the U-shape opening rearwardly. Vertical supports 60 may be affixed to the attachment plate 50 by an appropriate means such as welding and in a position to facilitate attachment of the entire digger apparatus 10 to the loader 1. Vertical supports 60 are provided with further means by which the digger apparatus 10 may be attached to the loader 1. In the embodiment illustrated in FIG. 2b, the means may include apertures 62 and a sleeve/aperture assembly 64 which fix the vertical supports 60 and that which is forwardly attached to the vertical supports 60, including the attachment plate 50 and scoop 30, to the hydraulic loader 1. The sleeve/aperture assembly 64 may be of the appropriate dimensions to receive a rod, such as rod 65. The rod 65 may be engaged by the arms of the hydraulic loader 1 such as through the reception of the rod 65 through an aperture in the end 90 of the arms of the hydraulic loader 1 as illustrated in FIG. 2b. Rod 65 is secured to the vertical support 60 by an appropriately sized bolt 66 fitted through an opening 67 in the sleeve-/aperture assembly 64 and through a second opening 68 in rod 65. Usual type locking means, such as nut 69 may hold the bolt 66 in place.

Another way by which backing plate 40 may be rigidly joined to the hydraulic loader 1 includes the welding of the backing plate 40 to an alternative attachment means 70. Alternative attachment means 70, in the embodiment which is illustrated in FIG. 3, includes the use of U-shaped, horizontal beams 72. The horizontal beams 72 may be spaced apart equally from each other, may extend vertically between the vertical side walls 45 of the backing plate 40, and may be placed in close proximity to the horizontal side walls 46 of the rear face 47 of the backing plate 40. The U-shape of the horizontal beams 72 opens rearwardly, that is, towards the hydraulic loader 1. The horizontal beams 72 are affixed to the backing plate 40 by an appropriate means such as welding.

Affixed to and situated rearwardly of the horizontal beams 72 are vertical beams 75. Similar to the above described vertical supports 60, which are attached to the above described embodiment utilizing the attachment plate 50, vertical beams 75 are also generally U-shaped structures with the U-shape opening also rearwardly. The vertical beams 75 in the embodiment illustrated in FIG. 3 are placed inwardly from the vertical side walls 45 of the backing plate 40 and may be spaced an equal horizontal distance from each other. Vertical beams 75 are affixed to the horizontal beams 72 at the points at which the vertical beams 75 contact the horizontal beams 72 and by an appropriate means such as welding.

The vertical beams 75, and thereby the entire digger apparatus 10, are connected to the conventional hydraulic cylinder and piston assembly of the conventional hydraulic loader by the use of appropriate adapting means. For example, as illustrated in FIGS. 3 and 5a–d, the means necessary to adapt the digger apparatus 10 to the loader 1 consists of a bar 76, affixed to the upper inside portion of the flange 77 of the vertical beam 75, and second apertures 78 through the lower portion of the flange 77 of the vertical beam 75. Digger apparatus 10 is affixed to the hydraulic loader 1 by engaging the bar 76 beneath by an upwardly turned, curved lip formed in an extension 92 attached to the arm of the hydraulic loader 1. Furthermore, the lower portion of the extension 92 of the arm of the hydraulic loader 1, may be affixed to the digger apparatus 10 by the reception through the second apertures 78 of a rod 94. Rod 94 may be held in place by appropriate means such as a cotter pin, not shown.

Scoop 30 illustrated in FIGS. 1 through 5a–d includes an elongated, concave shape whose dimensions may vary depending on the nature of the task for which the digger apparatus 10 is used. In the illustrated embodiments and particularly in FIG. 2, the scoop 30 is useful in the removal and transplantation of trees and has a longitudinal length "x" which may be approximately twice that of the vertical height "y" of the backing plate 40. In these same embodiments, the backing plate 40 has a width "z" which may be approximately two-thirds that of the length of the scoop 30. The concave upper surface 31 of scoop 30 is defined by an arc of an circle—having a radius "r" that may vary. Where the upper surface 31 of scoop 30 is to track a circular arc, radius "r" will remain constant. Where the upper surface 31 of scoop 30 is to track an elliptical-like arc, radius "r" will vary and increase in length toward the sides 38 of scoop 30. In the embodiment of the scoop 30 with the above illustrative proportions, "r" remains approximately constant in length and is about equal to the height "y" of the backing plate 40. The scoop 30 may be made of an appropriate material, such as standard hot-rolled A36 structural steel, which is of an appropriate thickness, such as three-eights inch when structural steel is used. Scoop 30 is affixed to the backing plate 40 by appropriate means such as by welding 32.

The scoop 30 includes further a base 34 which, in the area in which the scoop 30 contacts the backing plate 40, may not be flush with the lowermost of the horizontal side walls 46 of the backing plate 40; rather, base 34 extends groundward in this contact area. In the embodiment of the digger apparatus 10 with the proportions described above and as illustrated in FIGS. 1 through 5a–d, the base 34, in the area in which scoop 30 makes contact with the backing plate 40, extends groundwardly a small distance which may be several inches. It has been found that by extending the base 34 groundwardly from the backing plate 40 and by placing downward pressure on the digger apparatus 10 through the loader 1, the digger apparatus 10 can more easily crack hard-packed surface soil and thereby facilitate the movement of it by the digger apparatus 10.

Scoop 30 includes also sides 38 that converge at lip area 36. To facilitate entry of the digger apparatus 10 into the soil, the lip area 36 may have a relatively sharpened edge—formed by the machining of the forward portions of the sides 38 of the scoop 30—or a beveled edge.

In the preferred embodiment, the scoop 30 rises vertically forward from the area in which the scoop 30 contacts the backing plate 40 and toward to the lip area 36 so that the longitudinal axis of scoop 30 forms an angle "B" of sixty-five to eighty-five degrees with the vertical axis "y" of the backing plate 40. In the digger apparatus 10 illustrated in FIG. 2, and as shown in FIG. 4, this angle "B" is approximately eighty degrees. Angling the scoop 30 in this fashion acts to improve the lifting capability of and the carrying capacity of the scoop 30 since the tree or plant, which is removed by and transported on the digger apparatus 10 with such an angled scoop 30, will naturally lie with its weight stably shifted to the back portion of the scoop 30, which is wider and can better accommodate the plant.

In order to reinforce, to support, and to increase the carrying capacity of the scoop 30, and to insure the stability of top-heavy plants which may be removed and lifted with the digger apparatus 10, supporting means such as gussets 80 may be affixed to the scoop 30 and to the backing plate 40. The gussets 80 may be of any appropriate shape to accomplish the stated functions. In the digger apparatus 10 illustrated in FIGS. 1 through 5a–d, gussets 80 are triangular in shape and have a base 82 that contacts the sides 38 of the scoop 30. Gussets also preferably have an upper rearward leg 84 that contacts the front face 41 of the backing plate 40, as well as a forward angled leg 86 that extends from the upper termination of the rearward leg 84 to the forward termination of the base 82. Gussets 80 may be affixed to the scoop 30 and to the backing plate 40 by any appropriate method such as welding.

Gussets 80 also include an outer side 88 and an inner side 89 which may generally parallel each other. Depending on the application, outer side 88 and/or inner side 89 may parallel the vertical side walls 45 of the backing plate 40. In the embodiments illustrated in FIGS. 1 through 5a–d, inner side 89 and outer side 88 are angled outwardly with increasing upward vertical height from the point at which gussets 80 contact sides 38 of the scoop 30 so that an angle "A" is formed between the and outer side 88 and the vertical side walls 45 of the backing plate 40. This angle "A" may be of any size but less than ninety degrees. In the embodiment illustrated in FIGS. 2 and 2a, the inner side 89 and the outer side 88 of each of the gussets 80 generally parallel each other and the angle "A" is approximately thirty degrees. The gussets 80 may be made of any appropriate material such as structural steel and in any appropriate thickness, such as three-eights inch when structural steel is chosen as the appropriate material.

FIGS. 5a, 5b, 5c, and 5d illustrate the operation of the digger apparatus 10. As affixed to a hydraulic loader 1, the lip area 36 of the digger apparatus 10 is placed in proximity to the base of the plant which is to be removed. The loader's hydraulic mechanism is actuated thereby placing downward pressure on the digger apparatus 10. The digger apparatus 10 cuts the soil in a clean and naturally spherical fashion thereby not disrupting the soil closer to the base of the plant. The lack of disruption to the soil closer to the plant's base is important as it is well known that the soil area beneath and within a small radius of the base of the plant contains the greatest concentration of sensitive roots of the plant. These roots must not be damaged if the plant is to survive. Once the soil is cut around and under the plant, the plant may be lifted out of the ground. A concave-shaped hole will remain that, for example, can receive, with little additional effort, a new planting with root ball. Upon lifting, the plant will naturally rest in a stable fashion against the front face 41 of the backing plate 40, between the gussets 80—specifically the inner sides 89 of the gussets 80—and upon the concave upper face 31 of the scoop 30. The plant, and with the necessary soil still in place and encasing the roots of the plant, may then be conveyed with a minimum amount of swaying and with no, or only a limited amount of damage to the plant. The plant may be placed directly into a new hole by the digger apparatus 10. This new hole also may have been quickly dug in the appropriate concave shape by use of the digger apparatus 10. Because the plant is removed with the soil in place, the amount of time needed to cover the transplanted plant with soil is reduced. If the plant is not destined for immediate transplantation, the fact that the plant is removed with the soil in place allows the plant with possibly only a small amount of trimming needed, to be wrapped with the appropriate materials, such as burlap, for storage and sale purposes.

The digger apparatus 10 may also be used to move quantities of earth such as by directly digging into the soil, lifting the soil, and conveying it to a desired location. The digger apparatus 10 also may be used to move quantities of earth such as by scraping the soil. This is accomplished by pressing the digger apparatus 10 horizontally onto the surface of the soil and driving the digger apparatus 10 forward.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents that may be resorted to, fall within the scope of the invention.

What is claimed as new is as follows:

1. Digger apparatus for attachment to a conventional hydraulic loader, such as a wheel tractor or a crawler type tractor, comprising:

frame means for attaching said digger apparatus to said hydraulic loader;

scooping means secured to said frame, said scooping means being for digging into soil and removing a plant from soil within which the plant is growing with a minimal amount of disruption to the soil, said scooping means including an elongated, concave-shaped upper face and concave-shaped base coupled to said frame means;

said upper face and said base joined to define side edges;

supporting means, said supporting means including pieces affixed to said sides edges of said scooping means and to a forward face of said frame means for supporting and increasing the rearward carrying capacity of said scooping means, and said scooping means and said supporting means cooperating to form an enclosure means, said enclosure means being for stabilizing the plant carried on said scooping means and between said supporting means.

2. A digger as defined in claim 1 in which said side edges converge to define a rounded front lip area.

3. A digger as defined in claim 2 in which said rounded front lip area is sharpened.

4. A digger as defined in claim 2 in which said rounded front lip area is beveled.

5. A digger as defined in claim 1 in which said side edges are upturned.

6. A digger as defined in claim 5 in which said upturned sides of said scoop converge to a front lip area.

7. A digger as defined in claim 6 in which said front lip area is sharpened.

8. A digger as defined in claim 7 in which said pieces are triangular in shape.

9. A digger as defined in claim 8 in which a longitudinal axis of said scooping means forms an angle with a vertical axis of said frame means of less than ninety degrees.

10. A digger as defined in claim 9 in which a length of said scooping means is greater than a height of said frame means.

11. A digger attachment for a hydraulic loader, such as a wheel tractor or a crawler type tractor, having a hydraulically actuated loader mechanism which includes a pair of longitudinal pivoted lift arms arranged at opposite sides of the loader, with front end sections projected in a direction opposite to that of the hydraulic loader for normally supporting a bucket which has been detached and removed from the lift arms, said attachment comprising:

(a) a frame;

(b) means affixed to said frame and adapted to connect said frame to the hydraulically actuated loader mechanism for moving said frame;

(c) an elongated and concave scoop affixed to and forward of said frame, said scoop having an longitudinal axis which forms an angle to said frame of less than ninety degrees, said scoop having upturned side edges:
- (d) said upturned side edges having front portions which converge to define a front lip area;
- (e) gussets, consisting of support pieces affixed to the upturned side edges of the scoop in proximity to an area where the scoop contacts the frame, said gussets including an inner face and an outer face, oriented in a generally vertical fashion;
- (f) said gussets and said scoop cooperatively forming a stabilizing means, said stabilizing means being for facilitating the transfer of a plant on said scoop and between said gussets.

12. The digger attachment as defined in claim 11 wherein said gussets are triangular in shape.

13. The digger attachment as defined in claim 11 wherein said inner face and said outer face of said gussets angle upwardly and outwardly from an area at which said gussets are affixed to the upturned side edges of said scoop.

14. The digger attachment as defined in claim 11 wherein said scoop, at its point of contact with said frame, is disposed partially below a base of the frame and extends gradually upward to the lip area of said scoop so that the longitudinal axis of said scoop forms an angle of less than ninety degrees with the generally vertical frame.

15. A digger attachment as defined in claim 11, in which said frame includes a backing plate, said backing plate comprising a generally vertical plate to which said scoop is affixed.

16. A digger attachment as defined in claim 15, in which said backing plate is rigidly joined to said hydraulic loader by attachment means, said attachment means including an attachment plate.

17. A digger attachment as defined in claim 15 further including alternative attachment means, wherein said alternative attachment means including U-shaped, horizontal beams and vertical beams affixed rearwardly of said backing plate.

18. A hydraulic loader attachment comprising:
- (a) a frame, said frame having a front face;
- (b) a scoop connected forwardly of said front face, said scoop having a elongate concave-shaped upper face and an elongate concave-shaped base;
- (c) said upper face and said base joined into a side edge, said forward portion of said edge converging to form a front area;
- (d) said front area being chamfered to facilitate the entry of said scoop into the soil and the removal of a plant with limited damage to said plant;
- (e) supporting means, said supporting means including lower portions affixed to said side edge of said scoop and rear portions affixed to said vertical face of said frame;
- (f) said supporting means and said scoop cooperating to form an enclosure means, said enclosure means being for stabilizing the plant carried on said upper face of said scoop and between said supporting means.

19. A hydraulic loader attachment according to claim 18, in which the frame further comprises a backing plate, said backing plate being generally vertical and rearward of said scoop and said supporting means.

20. A hydraulic loader attachment according to claim 19 in which the frame further comprises an attachment plate, said attachment plate fixed rearward of said backing plate, for rigidly joining said backing plate to the hydraulic loader.

* * * * *

UNITED STATES PATENT AND TRADEMARK OFFICE
CERTIFICATE OF CORRECTION

PATENT NO. : 4,903,418

DATED : February 27, 1990

INVENTOR(S) : Robert W. Loudon

It is certified that error appears in the above-identified patent and that said Letters Patent is hereby corrected as shown below:

Column 3, line 12 "baking" should read --backing--.
Column 4, line 23, "h=" should read --be--.

Signed and Sealed this

Sixteenth Day of July, 1991

Attest:

HARRY F. MANBECK, JR.

Attesting Officer

Commissioner of Patents and Trademarks